US009360320B2

(12) United States Patent
Ashton

(10) Patent No.: US 9,360,320 B2
(45) Date of Patent: *Jun. 7, 2016

(54) AUTONOMOUS COORDINATION OF AGENTS VIA ATTRACTION AND REPULSION

(71) Applicant: RAYTHEON COMPANY, Waltham, MA (US)

(72) Inventor: Geoffrey D. Ashton, Marlborough, MA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/337,448

(22) Filed: Jul. 22, 2014

(65) Prior Publication Data
US 2016/0025495 A1     Jan. 28, 2016

(51) Int. Cl.
*G06F 17/00* (2006.01)
*G01C 21/00* (2006.01)

(52) U.S. Cl.
CPC ...................... *G01C 21/00* (2013.01)

(58) Field of Classification Search
CPC ........................................... G01C 21/00
USPC ............................................... 701/3
See application file for complete search history.

(56) References Cited

U.S. PATENT DOCUMENTS

| 5,058,833 | A | 10/1991 | Carmouche |
| 5,764,239 | A | 6/1998 | Misue et al. |
| 6,507,771 | B2 * | 1/2003 | Payton ............... G05D 1/0242 318/568.1 |
| 7,320,289 | B1 | 1/2008 | Clarke et al. |
| 7,839,101 | B2 | 11/2010 | Yu et al. |
| 8,234,067 | B2 * | 7/2012 | Bauer ................. G01C 21/005 701/301 |
| 8,494,689 | B1 * | 7/2013 | Ashton ................... G06F 17/00 318/135 |
| 8,781,727 | B1 * | 7/2014 | Bonawitz ............... G05D 1/104 701/410 |
| 8,849,571 | B1 * | 9/2014 | Bonawitz ............ G06Q 10/047 701/527 |
| 8,935,035 | B1 * | 1/2015 | Bogdanowicz .......... G08G 1/20 701/26 |

(Continued)

FOREIGN PATENT DOCUMENTS

EP    2423774 A1    2/2012

OTHER PUBLICATIONS

Grace Period Disclosure—Geoffrey D. Ashton, "Autonomous Coordination of Agenets," U.S. Pat. No. 8,494,689 B1, Date of Issuance: Jul. 23, 2013, pp. 1-16.

(Continued)

*Primary Examiner* — Mussa A Shaawat
*Assistant Examiner* — Michael Berns
(74) *Attorney, Agent, or Firm* — Cantor Colburn LLP

(57) ABSTRACT

A method of controlling movement of an agent operating within an autonomous system includes determining, using a processing device associated with the agent, at least one point of interest (POI) within an area of operation by the autonomous system; determining, from the at least one POI, a POI of highest attraction for the agent and calculating an attraction force for the agent, based on the location of the POI of highest attraction; determining proximity of the agent to one or more additional agents operating within the autonomous system, and calculating a repulsion force for the agent so as to maintain a minimum separating distance between the agent and the one or more additional agents; calculating a resultant force for the agent based on the attraction force and the repulsion force; and changing a direction of the agent based on the resultant force.

20 Claims, 19 Drawing Sheets

(56) References Cited

U.S. PATENT DOCUMENTS

2002/0138179 A1    9/2002  Payton et al.
2009/0099768 A1    4/2009  Bauer et al.
2011/0118980 A1*   5/2011  Hoy ..................... G08G 5/045
                                                          701/301

OTHER PUBLICATIONS

J. Ruchti, et al., "UAV Collision Avoidance Using Artifical Potential Fields," Techical Report CSSE11-03, Jul. 6, 2011, pp. 1-21.

Ian F. Akyildiz, et al.,"Wireless Multimedia Sensor Networks: Applications and Testbeds," Proceedings of the IEEE, vol. 96, No. 10, pp. 1588-1605, Oct. 2008.

Tommaso Melodia, et al., "Handling Mobility in Wireless Sensor and Actor Networks," IEEE Transactons on Mobile Computing, vol. 9, Issue 2, pp. 1-14, Feb. 2010.

Notification of Transmittal of the International Preliminary Report on Patentability and the Written Opinion of the International Searching Authority, or the Declaration; PCT/US2015/030544; Jan. 8, 2016, 6 pages.

* cited by examiner

AUTONOMOUS COORDINATION OF AGENTS VIA ATTRACTION AND REPULSION

The following disclosure is submitted under 35 U.S.C. 102(b)(1)(A): U.S. Pat. No. 8,494,689 to Ashton, issued Jul. 23, 2013.

BACKGROUND

The present disclosure relates generally to swarm navigation techniques and, more particularly, to a method and system for autonomous coordination of agents.

An autonomous system is one that can perform tasks in a dynamic environment without continuous human supervision, and possesses the ability to alter its behavior based on its interactions with the surrounding environment. Autonomous systems capable of performing such advanced functions have been limited due to the difficulty in designing approaches that are practical to implement. With advances in technology and the emergence of Unmanned Aerial Vehicles (UAVs), such UAVs present an ideal platform for autonomous technology that could be applied in numerous applications, such as persistent surveillance and communications relay, for example.

UAV technology is currently a very active area of research, with platforms being studied ranging from fighter sized aircraft to insect sized platforms that can be used in a multitude of applications, such as border security, disaster response, and military applications. For these applications, a demand exists for low cost platforms that could be used for persistent surveillance and communications relay over large areas and for long periods of time.

SUMMARY

In an exemplary embodiment, a method of controlling movement of an agent operating within an autonomous system includes determining, using a processing device associated with the agent, at least one point of interest (POI) within an area of operation by the autonomous system; determining, from the at least one POI, a POI of highest attraction for the agent and calculating an attraction force for the agent, based on the location of the POI of highest attraction; determining proximity of the agent to one or more additional agents operating within the autonomous system, and calculating a repulsion force for the agent so as to maintain a minimum separating distance between the agent and the one or more additional agents; calculating a resultant force for the agent based on the attraction force and the repulsion force; and changing a direction of the agent based on the resultant force.

In another embodiment, a moveable agent configured to operate within an autonomous system includes a processing platform having at least one general-purpose programmable processor. The processor is configured to: determine, using a processing device associated with the agent, at least one point of interest (POI) within an area of operation by the autonomous system; determine, from the at least one POI, a POI of highest attraction for the agent and calculating an attraction force for the agent, based on the location of the POI of highest attraction; determine proximity of the agent to one or more additional agents operating within the autonomous system, and calculating a repulsion force for the agent so as to maintain a minimum separating distance between the agent and the one or more additional agents; calculate a resultant force for the agent based on the attraction force and the repulsion force; and change a direction of the agent based on the resultant force.

BRIEF DESCRIPTION OF THE DRAWINGS

For a more complete understanding of this disclosure, reference is now made to the following brief description, taken in connection with the accompanying drawings and detailed description, wherein like reference numerals represent like parts:

FIG. 10 is another schematic diagram of the second scenario as the second UAV remains in the vicinity of the third point of interest after the third point of interest has been claimed by the third UAV, with no additional points of interest for the second UAV to be attracted to;

DETAILED DESCRIPTION

Figure 1:
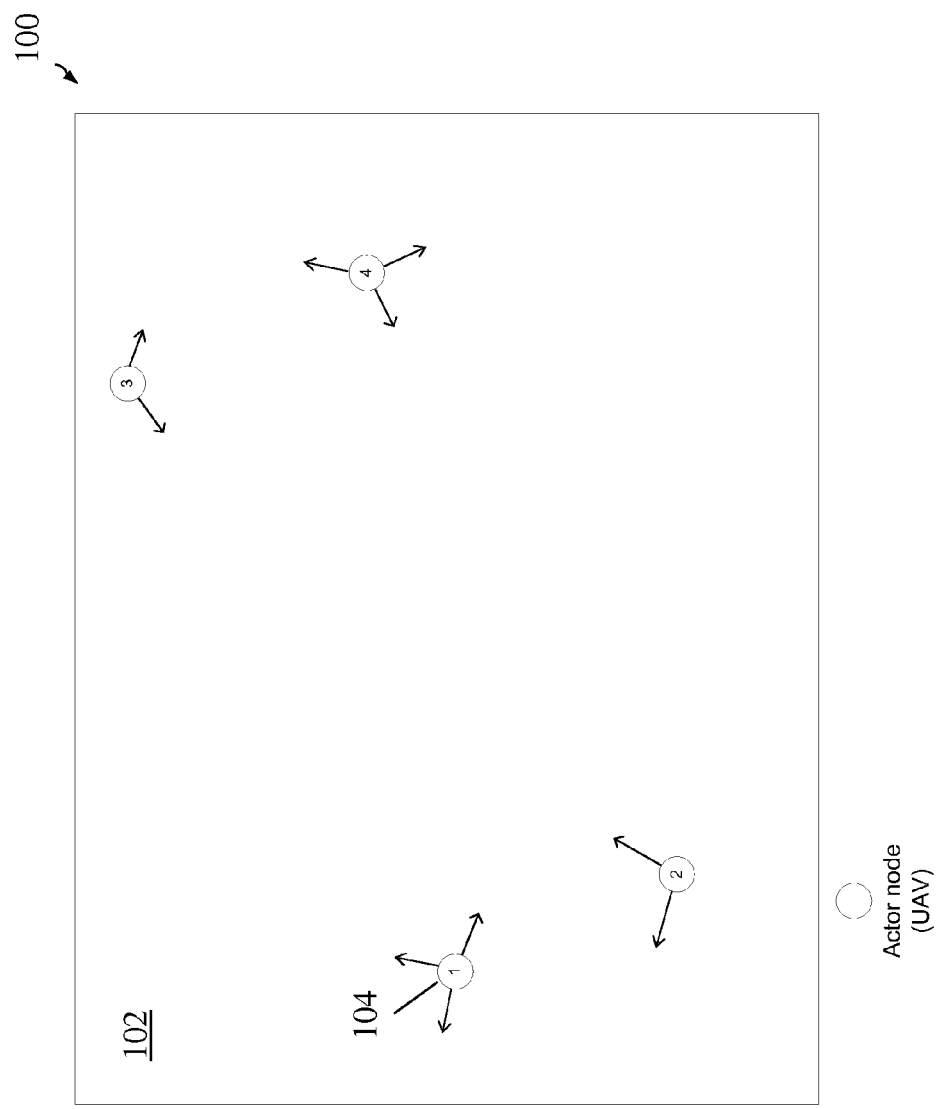
FIG. 1 is a schematic diagram illustrating an autonomous system utilizing unmanned aerial vehicles (UAVs) in accordance with an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature(s) being described. Also, the description is not to be considered as limiting the scope of the embodiments described herein.

One approach to the above described need for low cost platforms that could be used for persistent surveillance and communications relay over large areas and for long periods of time involves the use of many small, low cost, autonomous vehicles that use biologically inspired swarming algorithms for coordinated, cooperative control. However, these autonomous platforms need flexible algorithms capable of allowing the UAVs to adapt to various situations in their environment while providing the ability for the UAVs to coordinate for collaborative responses. Ideally, the system would have the ability to coordinate and react to different situations with different responses.

Thus, one problem addressed by the present embodiments relates to the need for an autonomous method for coordination of agents. Autonomy is a highly desirable trait for new systems, be it those with physical agents (e.g., robots) or non-physical agents (e.g., software). While autonomy may represent a major desire in new systems, it is another matter to design an autonomous system that is both practical and implementable. Existing approaches have utilized predefined maps or beacons to implement "attraction and repulsion" autonomous algorithm. However, the main drawback with such solutions is that the technique is largely predefined and based on other agents or waypoints in the system. In contrast, an approach taken in the present disclosure is reactive based on points of interest detected by the system, and has less predefined components of the system with respect to previous approaches.

Accordingly, disclosed herein are an architecture, framework, method and system for autonomous coordination of agents. In the exemplary embodiments herein, the agents are described in the context of Unmanned Aerial Vehicles (UAVs). However, it will be understood that the principles are equally applicable to other types of mobile vehicles such as land, sea, air or space based. In any event, an autonomous system agent in accordance with the present embodiments performs tasks in a dynamic environment without continuous human supervision and alters its behavior based on the interactions it has with the environment.

Using an attraction and repulsion method in a system, one or more UAVs capable of, but not limited to, surveillance and communication randomly distribute themselves about an area until the detection of one or more points of interest (POI) requires action. Upon POI determination, the UAVs coordinate and collaborate autonomously without human interaction and provide coverage for each POI, assuming there are at least as many UAVs as there are POIs. The attraction and repulsion method works in such a way that each UAV is initially attracted to a POI of highest attraction, based on factors such as proximity to the POI and whether the UAV has determined that the POI has already been claimed by another UAV. At the same time, the UAVs are repulsed from each other as they come into close proximity of one another. This allows the UAVs to cover as many POIs as there are UAVs, while requiring no human interaction or decision making.

Referring initially to FIG. 1, there is shown a schematic diagram illustrating autonomous system 100 utilizing unmanned aerial vehicles (UAVs) in accordance with an exemplary embodiment. As illustrated, the system 100 may be completely autonomous, requiring input from a user only in terms of an area 102 of operation (i.e., user defined boundaries) by one or more actor nodes 104. Although not illustrated in FIG. 1, the exemplary architecture 100 may also include one or more transmission stations and/or one or more stationary sensor nodes that may include low power, radio capable sensors that are randomly distributed throughout the area 102 under observation to collect, communicate and/or analyze data. The actor nodes 104 may be embodied by mobile UAVs that have advanced computing and action capabilities with respect to any sensor nodes. The UAVs 104 may have the further capability of using one another to pass their own data to/from a communication station, and in the course of covering or patrolling the area 102 would initially move about the area 102 in a random fashion until such time as a point of interest is detected.

As indicated previously, the UAVs 104 are programmed to cover the entire area 102, without clustering or running into each other, using an attraction and repulsion method. Similar to the way in which two identically polarized ends of two different magnets repel each other when brought together, when two UAVs 104 come into a predetermined proximity of each other, evasive actions are be taken by each to redirect their current path of movement. Algorithms used to control the UAVs 104 may, for example, place a certain "value of repulsion" for the situation when two UAVs came into proximity of distance d to each other. This repulsion factor will be explained further in conjunction with an "attraction factor" used to control UAV response to point of interest detection.

As is the case with the programming of the UAVs 104 with a repellent factor to create separation therebetween, "attraction factors" are also applied to draw the UAVs 104 to a point of interest. Specific examples of these scenarios are described in further detail below.

Figure 2:
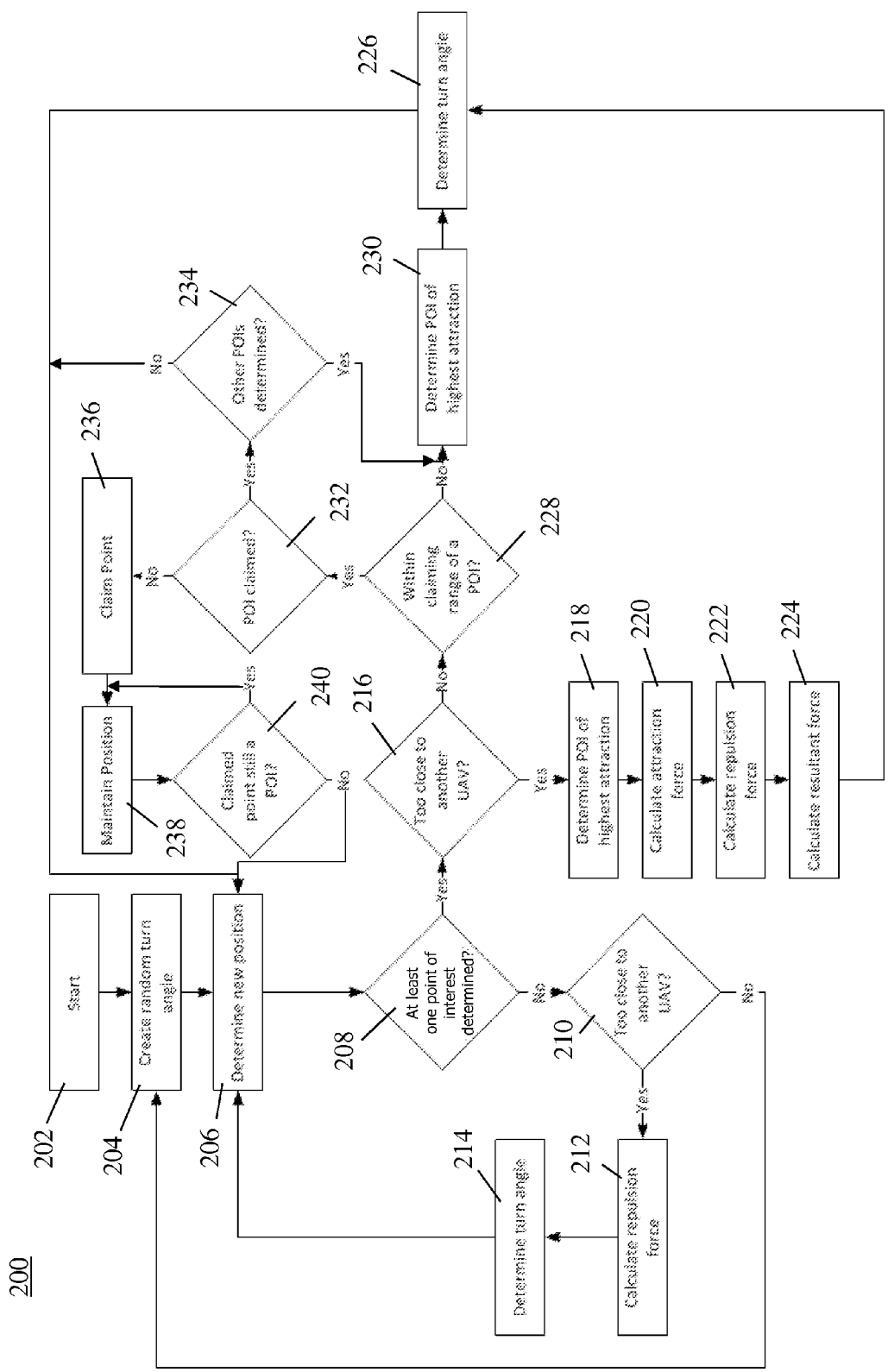
FIG. 2 is a flow diagram illustrating a method of positioning a UAV used in the autonomous system, in accordance with an exemplary embodiment.

Referring now to FIG. 2, there is shown a flow diagram 200 illustrating a method of controlling movement of an agent operating within an autonomous system. Each UAV within the system may have the capability of executing such an algorithm. Beginning from start block 202, the method proceeds to block 204 in which a random turn angle for the UAV is generated, consistent with an initial state where the UAVs are moving randomly about the area under surveillance. As the UAV moves in accordance with a random turn angle (e.g., within a predefined turn angle limit, and for a set amount of time), it then determines its new position, as illustrated in block 206.

As reflected in decision block 208, the algorithm continually checks to see whether at least one point of interest has been determined, at which time the UAV would be called into action. A point of interest may be determined in a variety of ways, and in particular determined by/communicated to the UAV such as by (for example) a base station, via communication channels through satellites, or via sensors associated with the UAVs. It should be appreciated that such examples are by no means an exhaustive list. Further, there may be one or several points of interest, as will be described in the examples that follow.

Assuming, however, in a first case that no such points of interest are determined, the process proceeds from decision block 208 to decision block 210 to determine whether the UAV is "too close" to any other UAV, i.e., whether the UAV is within a predefined distance of another UAV. If not, the UAV may continue on its course, and return to block 204 for creating another random turn angle. On the other hand, if it is determined at decision block 210 that the UAV is in fact too close to one or more other UAVs, then the algorithm proceeds to block 212 for calculation of a repulsion force. More specifically, the total repulsion forces on each UAV as a result of all the UAVs within the predefined distance are calculated, and a resultant repulsion force and angle are determined.

By way of example, if three UAVs are within the predefined proximity of each other, each UAV will have two UAVs applying repulsion forces on it, resulting in a total force and angle. Each UAV then determines which way to turn with respect to its current direction of travel, as indicated in block 214. The total repulsion forces, resultant force, and resultant angle and turn angle are calculated until the UAV(s) in question create enough distance between them as compared to the predefined "too close" distance. The turn angle determined based on the repulsion action results in a new position, as the process returns to block 206. Assuming there are still no points of interest detected (decision block 208 still no), once the UAV attains a sufficient distance of separation (decision block 210 result is no), the UAV may resume moving with random turn angles as in block 204.

On the other hand, if at decision block 208 it is determined that at least one point of interest has been determined, the process shifts from a monitor phase to a response phase. First, however, the process proceeds to decision block 216 to once again determine whether the UAV is too close in proximity to any other of the UAVs. Assuming first a case where the UAV is in fact too close to another UAV (decision block 216 is yes), the UAV will both (1) avoid other UAVs and (2) respond to a point of interest. Specifically, in block 218, the process determines a point of interest (POI) of highest attraction among the one or more determined POIs. In one embodiment, among two or more identified POIs, the one in closest proximity to the UAV may be determined as the one of highest attraction. Other variables may also be used, such as a weighting scheme for example, to place certain POIs at higher importance in respect to other POIs (i.e., higher attraction levels).

Once the POI of highest attraction is determined, the process proceeds to block 220 to calculate an attraction force used to direct the UAV in the direction of the POI. Since, in this branch of the algorithm the UAV is determined to be too close to another UAV, in addition to calculating an attraction force the process proceeds to block 222 to calculate a total repulsion force from the repulsion forces on the UAV, thereby determining a resultant force and angle on the UAV in block 224. After comparison with the current direction of travel of the UAV, a decision about which direction to turn is made, as indicated in block 226. This allows the UAVs to keep their separation, yet continue to move closer to their respective POI of highest attraction. The process continues back to block 206 for new position calculation and further confirmation of POI determination and proximity detection to other UAVs.

In the event that at least one point of interest is still determined (decision block 208 is yes) and the UAV is no longer too close to another UAV (decision block 216 is no), then the process proceeds to decision block 228 where it is determined whether the UAV is within claiming range of a POI. By "claiming", if the UAV is the first UAV to reach a POI, the UAV may claim the POI by maintaining its position at or near the POI. The "claiming range" may be a predefined distance from the POI that, for example, puts the UAV in close enough proximity to determine whether the POI has already been claimed by another UAV, and if not, to claim the POI.

In the event that the UAV is not yet within claiming range of a POI, the process proceeds to block 230 to re-determine the POI of highest attraction. This could result in the same POI as previously determined or perhaps result in a different POI of highest attraction (e.g., if evasive maneuvers from another UAV resulted in the UAV now being closer to another POI). Once the POI of highest attraction is determined (whether the same as previously determined or a new POI is determined), the process proceeds to block 226 for determination of a turn angle before looping back to block 206 to determine a new position of the UAV.

Eventually, it is contemplated that a UAV will: (1) determine at least one point of interest, (2) determine that it is not too close to another UAV, and (3) determine that it is now within claiming range of a POI. At this point, the process proceeds to decision block 232 where the UAV determines whether the POI has already been claimed by another UAV. Assuming first that the answer is yes (i.e., the POI has already been claimed by another UAV), the process proceeds to decision block 234 to determine whether there are any other POIs to investigate. If there are no other POIs to investigate, the process will loop back to block 206. So long as the claimed POI exists, and the UAV is not too close to another UAV, and no other POIs are determined, the UAV will essentially maintain a type of holding pattern in the vicinity of the claimed POI. If that POI no longer exists, the process will break out of the loop at decision block 208 and return to a random patrolling pattern (i.e., cycle through blocks 208/210/212/214/206). On the other hand, if other POIs have been determined at decision block 234, then the process proceeds to block 230 as previously described where the UAV will then determine the POI of highest attraction.

In order for the UAV to become "unattracted" to the claimed POI which it also is within claiming range of, the weighting of an already claimed POI is set such that the already claimed POI is no longer the POI of highest attraction to the UAV in question. Thus, one or more other POIs for which the UAV does not yet know the claiming status would be more attractive to the UAV. As a result, the UAV may decide that the next closest POI of unknown claiming status is now the new POI of highest attraction. In this case, the process proceeds to block 226 to determine a new turn angle consistent with heading toward the new POI of highest attraction, and then to block 206 to determine a new position.

Referring once again now to decision block 232, if the UAV is within claiming range of a POI and the POI has not been claimed by another UAV, then the process proceeds to block 236 where the UAV claims the POI. This results in the UAV maintaining its position at the POI as shown in block 238, so long as the claimed POI still remains a POI as reflected in decision block 240. In the event that the claimed POI is no longer a POI, then the process will revert back to block 206 as described above.

Figure 3:
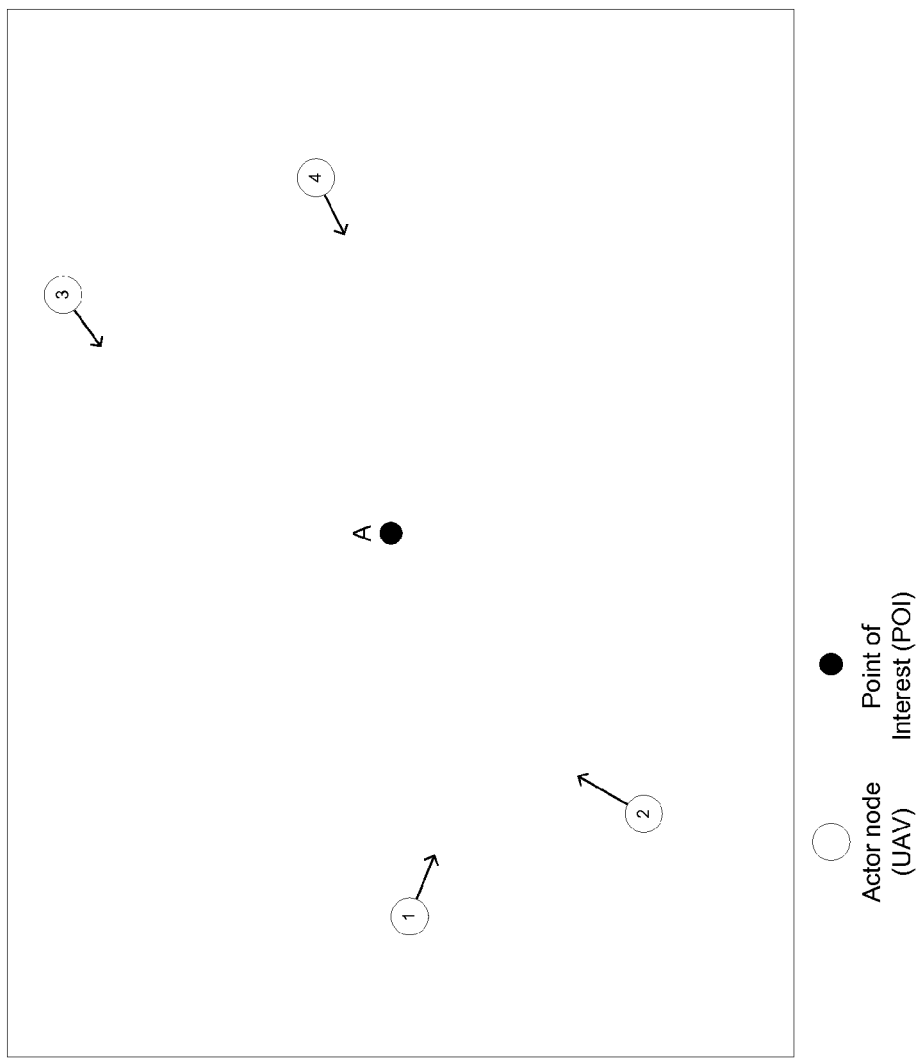
FIG. 3 is a schematic diagram illustrating a first scenario in which a point of interest determined by four UAVs results in each UAV changing their random direction to move toward the point of interest.
Figure 4:
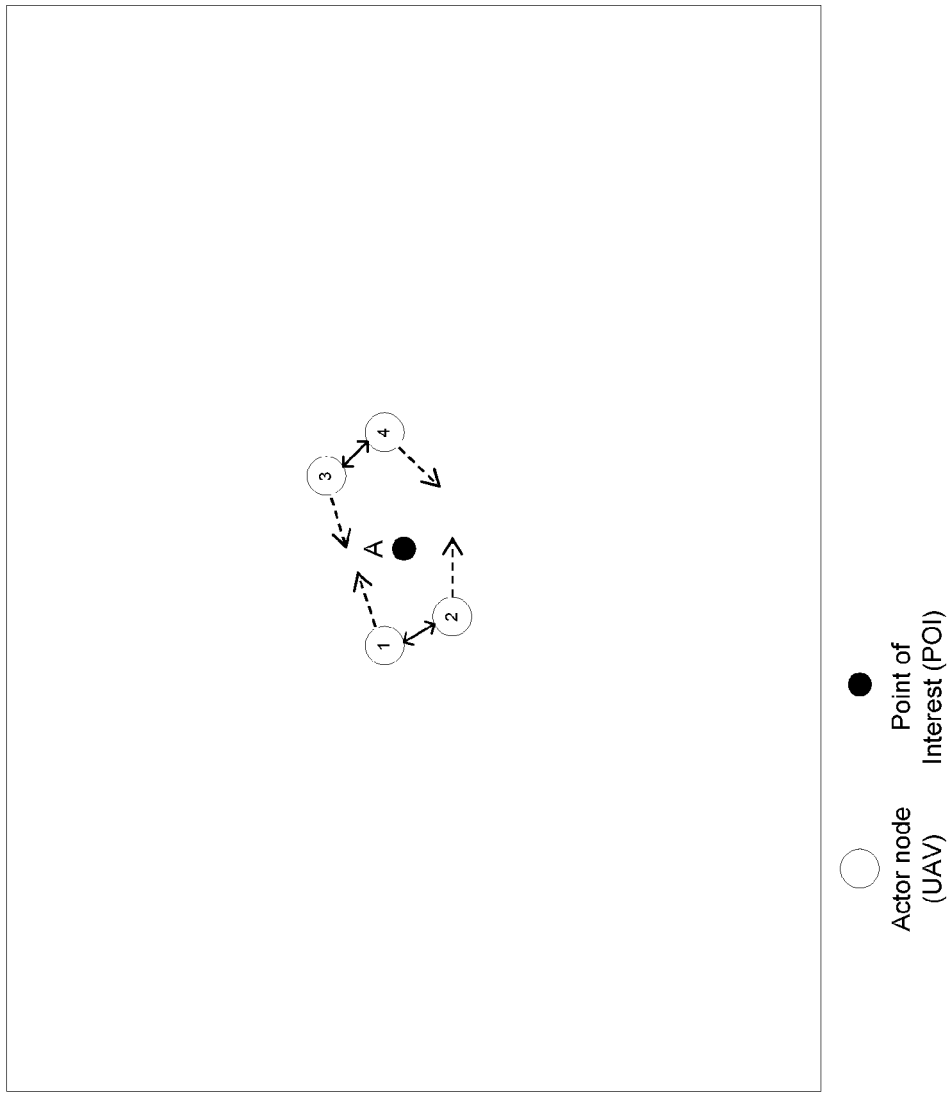
FIG. 4 is another schematic diagram of the first scenario as the UAVs approach the point of interest and come into close proximity with one another.
Figure 5:
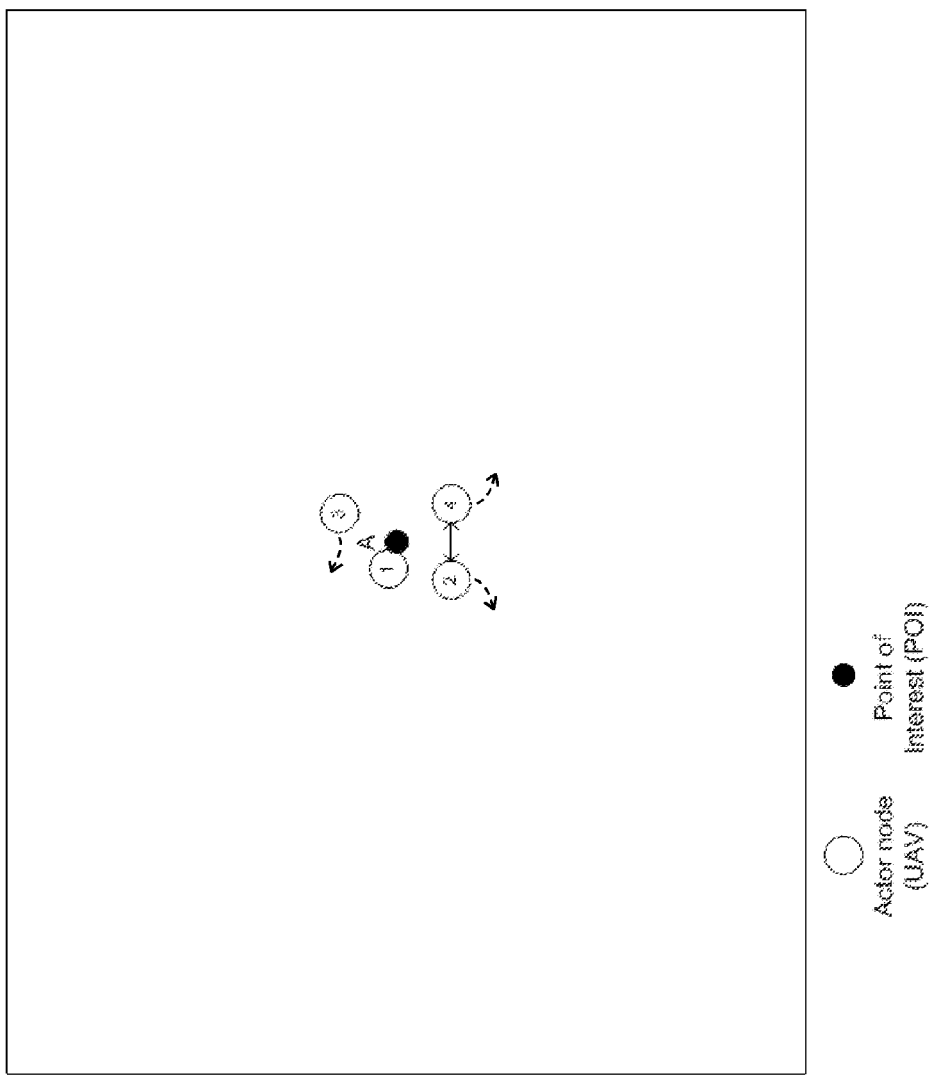
FIG. 5 is another schematic diagram of the first scenario as one of the UAVs claims the point of interest and the remaining UAVs remain in the vicinity of the point of interest.

In order to further illustrate the process 200 described above for an individual UAV, and the resulting interaction between different combinations of available UAVs and determined POIs, FIGS. 3-17 are a series of schematic diagrams illustrating several scenarios involving UAVs and one or more determined POIs. Referring first to FIGS. 3-5, a first scenario is depicted in which a single POI ("A") is determined by four separate UAVs. In FIG. 3, POI "A" is detected by four UAVs (1-4). According to the programming of each UAV, they all determine the POI (block 208 of FIG. 2) and change their random direction to begin to head toward it. As then shown in FIG. 4, there comes a point at which UAVs 1 and 2 are now too close to one another, and UAVs 3 and 4 are too close to one another. As a result, UAVs 1 and 2 are repelled from one another, as are UAVs 3 and 4 from one another (reflected by the double sided arrows). Although this results in a change of direction for each UAV, they are all still attracted to POI "A" while maintaining a sufficient distance from one another to avoid collision (reflected by the dashed arrows).

Eventually, one of the four UAVs will be the first to be within claiming range of POI "A". In the example illustrated, FIG. 5 depicts POI "A" being claimed by UAV 1 such that UAV 1 maintains its position at POI "A". The other UAVs 2-4 in this scenario determine that POI "A" is already claimed by UAV 1 and, being that there are no other POIs determined, will remain in the vicinity of POI "A" while also avoiding one another. Essentially, the UAVs in this scenario "swarm" around POI "A". Several situations could then break this pattern, such as a new POI being determined (in which case UAVs 2-4 would head to the newly determined POI). If POI "A" were to no longer exist, then each of UAVs 1-4 would resume a random patrol pattern (i.e., as in FIG. 1). If perhaps UAV 1 were to become disabled or fail, then one of UAVs 2-4 would first determine POI "A" is no longer claimed, and then claim it.

Figure 6:
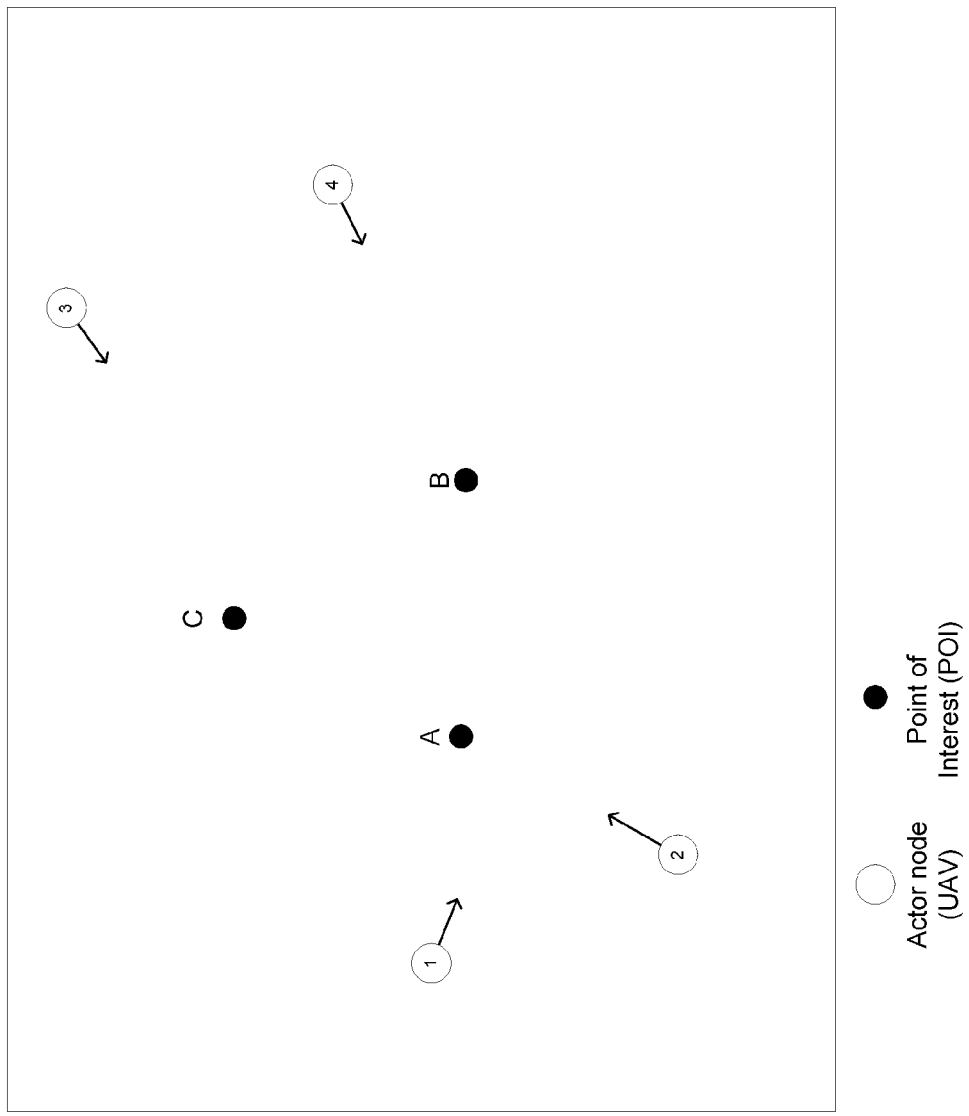
FIG. 6 is a schematic diagram illustrating a second scenario in which three points of interest determined by four UAVs results in each UAV changing their random direction to initially move toward the point of interest of highest attraction.
Figure 7:
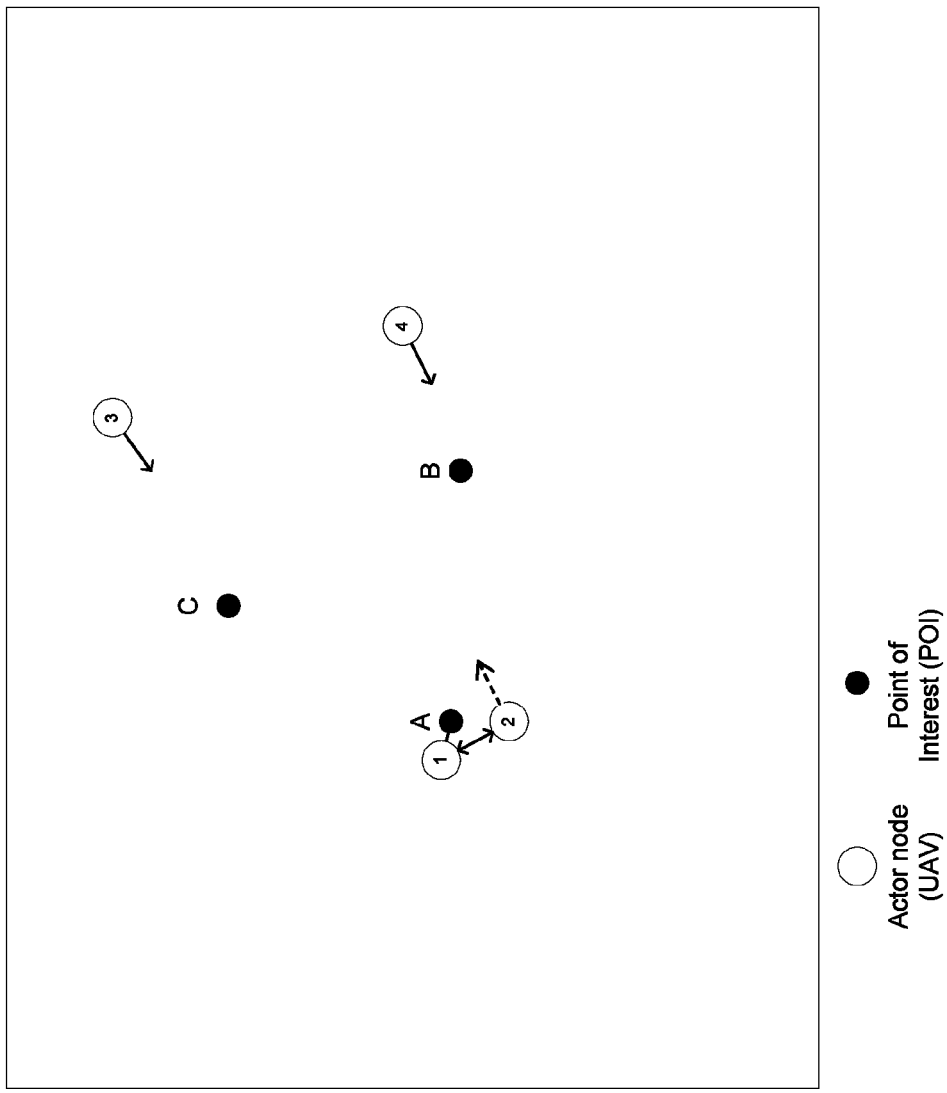
FIG. 7 is another schematic diagram of the second scenario as the first and second UAVs both approach a first point of interest and come into close proximity with one another.
Figure 8:
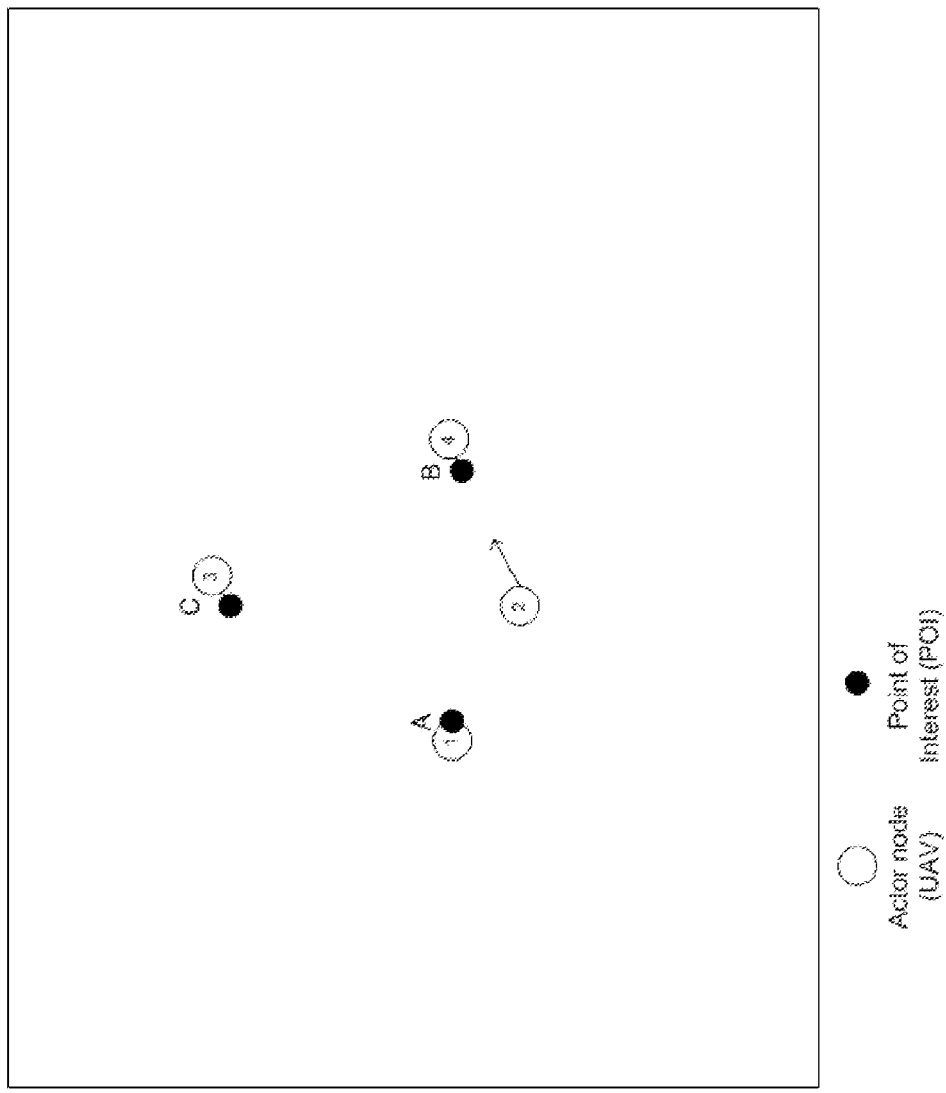
FIG. 8 is another schematic diagram of the second scenario as the second UAV moves toward a second point of interest after the first point of interest has been claimed by the first UAV.

Referring now to FIGS. 6-10, a second scenario is depicted in which three POIs ("A", "B", "C") are determined by four separate UAVs. In FIG. 6, UAV 1 and UAV 2 initially determine POI "A" as their POI of highest attraction and both head toward it. UAV 3 determines POI "C" as its POI of highest attraction, while UAV 4 determines POI "B" as its POI of highest attraction. As the UAVs approach their respective POIs of highest attraction in FIG. 7, it is seen that UAV 1 and UAV 2 become too close in proximity with respect to one another, and thus a repulsion force is generated between the two. Since UAV 1 is closer to POI "A", the result is that UAV 2 is directed away from POI "A". Then, as shown in FIG. 8, POI "A" has now been claimed by UAV 1, POI "C" is claimed by UAV 3, and POI "B" is claimed by UAV 4. UAV 2, having been within claiming range of POI "A" and having determined that POI "A" was already claimed by UAV 1, then becomes most attracted to POI "B" (not yet aware of the claim status of POI "B") and heads toward it.

Figure 9:
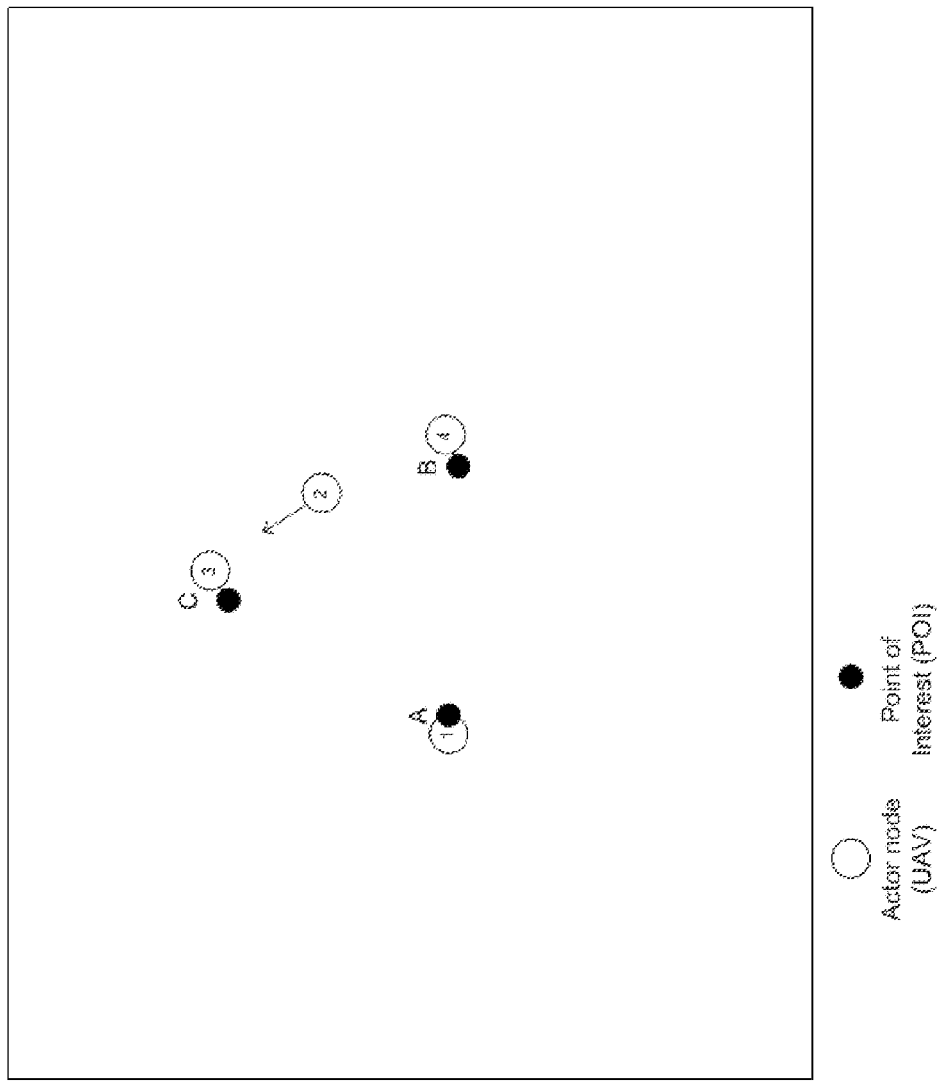
FIG. 9 is another schematic diagram of the second scenario as the second UAV moves toward a third point of interest after the second point of interest has been claimed by the fourth UAV.
Figure 10:
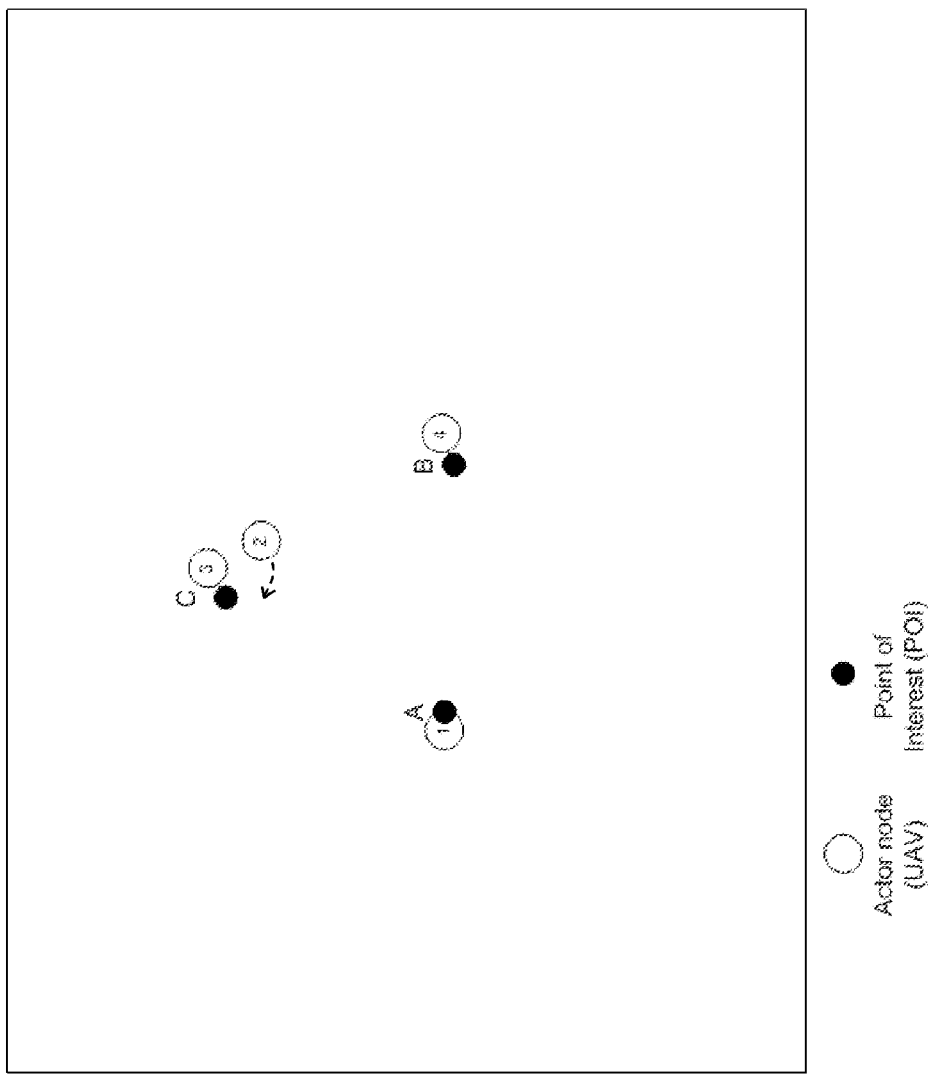

As shown in FIG. 9, once UAV 2 reaches claiming range of POI "B" and determines that POI "B" is also claimed, then uninvestigated POI "C" becomes the new POI of highest attraction for UAV 2, and thus UAV 2 now heads for POI "C". Finally, in FIG. 10, after reaching claiming range of POI "C" and having determined that it is also claimed, UAV 2 may remain in the vicinity of POI "C" as it has now checked all existing POIs. As an alternative embodiment, it is contemplated that UAV 2 could begin another cycle of rechecking the other POIs in the event that perhaps one of the other claiming UAVs has failed. In this case, the weighting criteria could (for example) make the most recently checked POI that is already claimed now be the least attractive to UAV 2, thus making (for example) POI "A" once again the most attractive to UAV 2 so that it will return again to POI "A".

Figure 11:
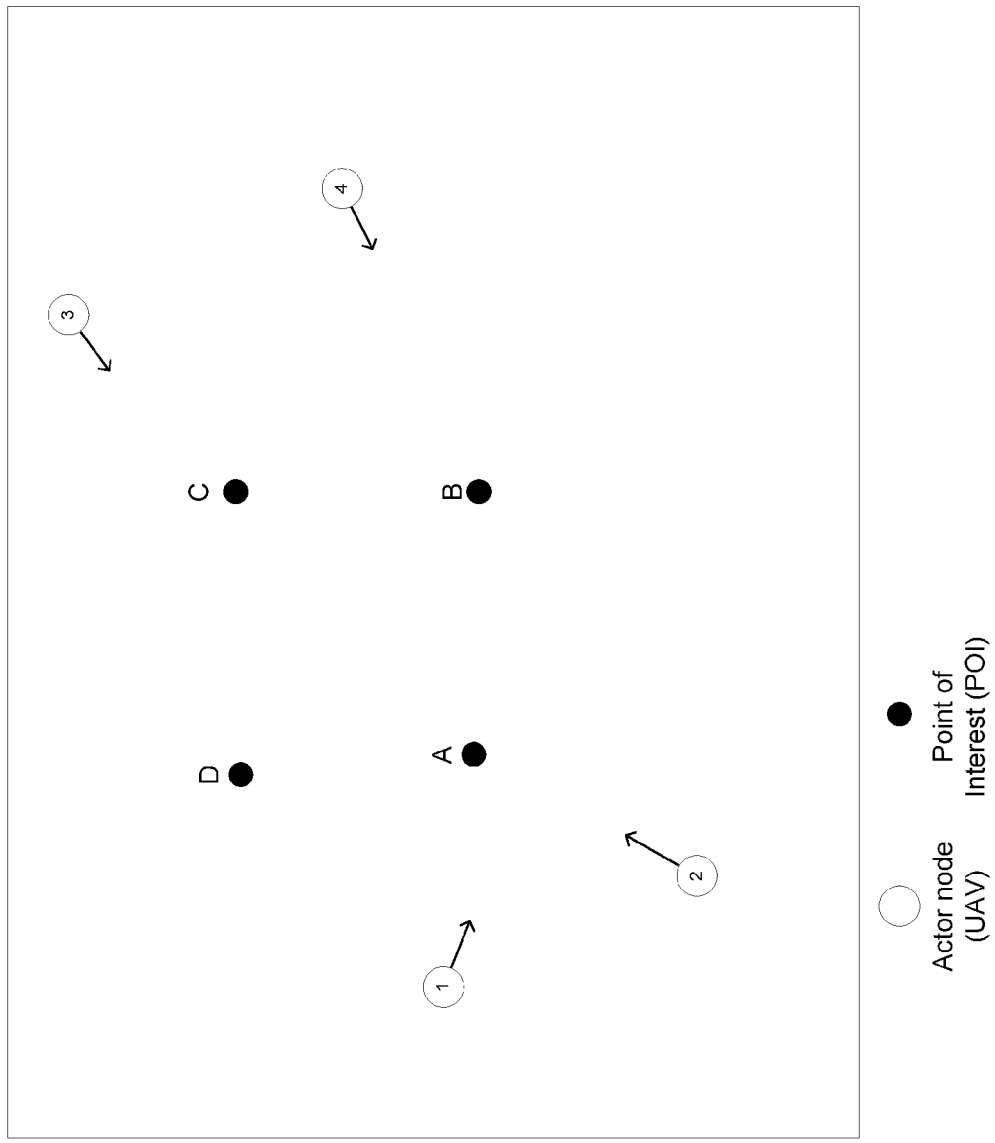
FIG. 11 is a schematic diagram illustrating a third scenario in which four points of interest determined by four UAVs results in each UAV changing their random direction to initially move toward the point of interest of highest attraction.
Figure 12:
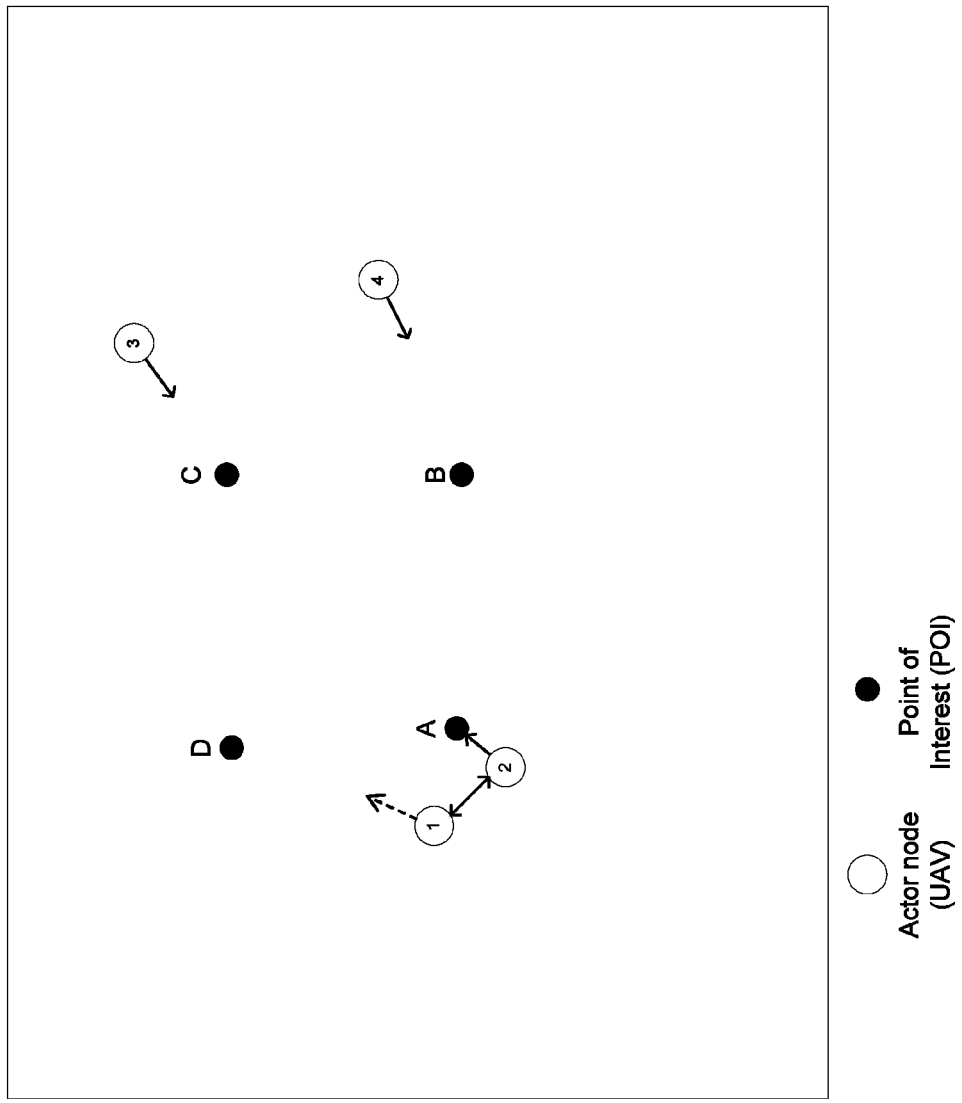
FIG. 12 is another schematic diagram of the third scenario as the first and second UAVs both approach a first point of interest and come into close proximity with one another, and the first UAV is redirected toward a second point of interest.
Figure 13:
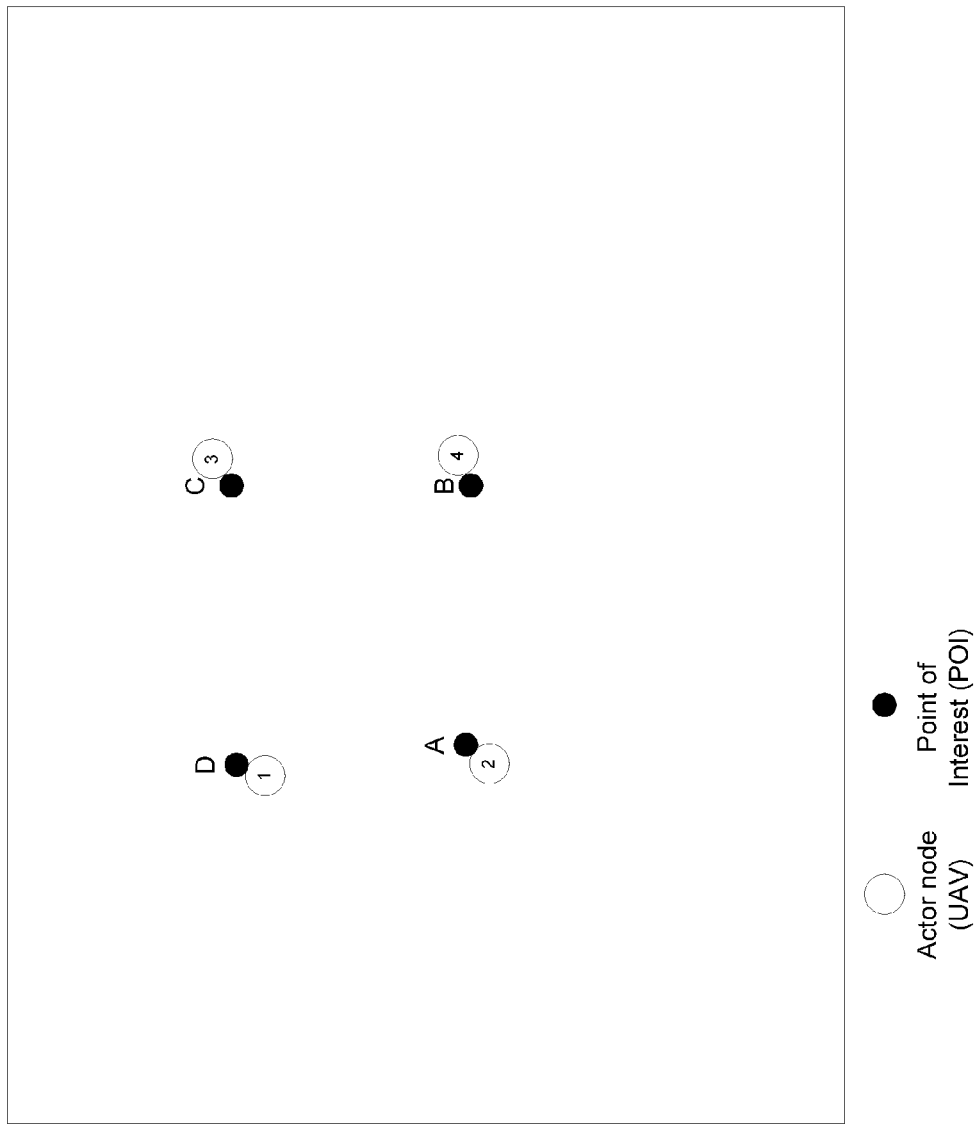
FIG. 13 is another schematic diagram of the third scenario illustrating each point of interest being claimed by a respective UAV.

A third scenario is illustrated in FIGS. 11-13. In this example, there are four POIs ("A", "B", "C", "D") determined by four separate UAVs. In FIG. 11, UAV 1 and UAV 2 initially determine POI "A" as their POI of highest attraction and both head toward it. UAV 3 determines POI "C" as its POI of highest attraction, while UAV 4 determines POI "B" as its POI of highest attraction. As the UAVs approach their respective POIs of highest attraction in FIG. 12, it is seen that UAV 1 and UAV 2 become too close in proximity with respect to one another, and thus a repulsion force is generated between the two. Since UAV 2 is closer to POI "A", the result is that UAV 1 is directed away from POI "A". In contrast to the second scenario, when UAV 2 beats UAV 1 to POI "A", then POI "D" becomes most attractive to UAV 1. Since there is one UAV for each POI, in this scenario when UAV 1 reaches POI "D" in FIG. 13, it is able to claim it since the other UAVs have each claimed their own POIs.

Figure 14:
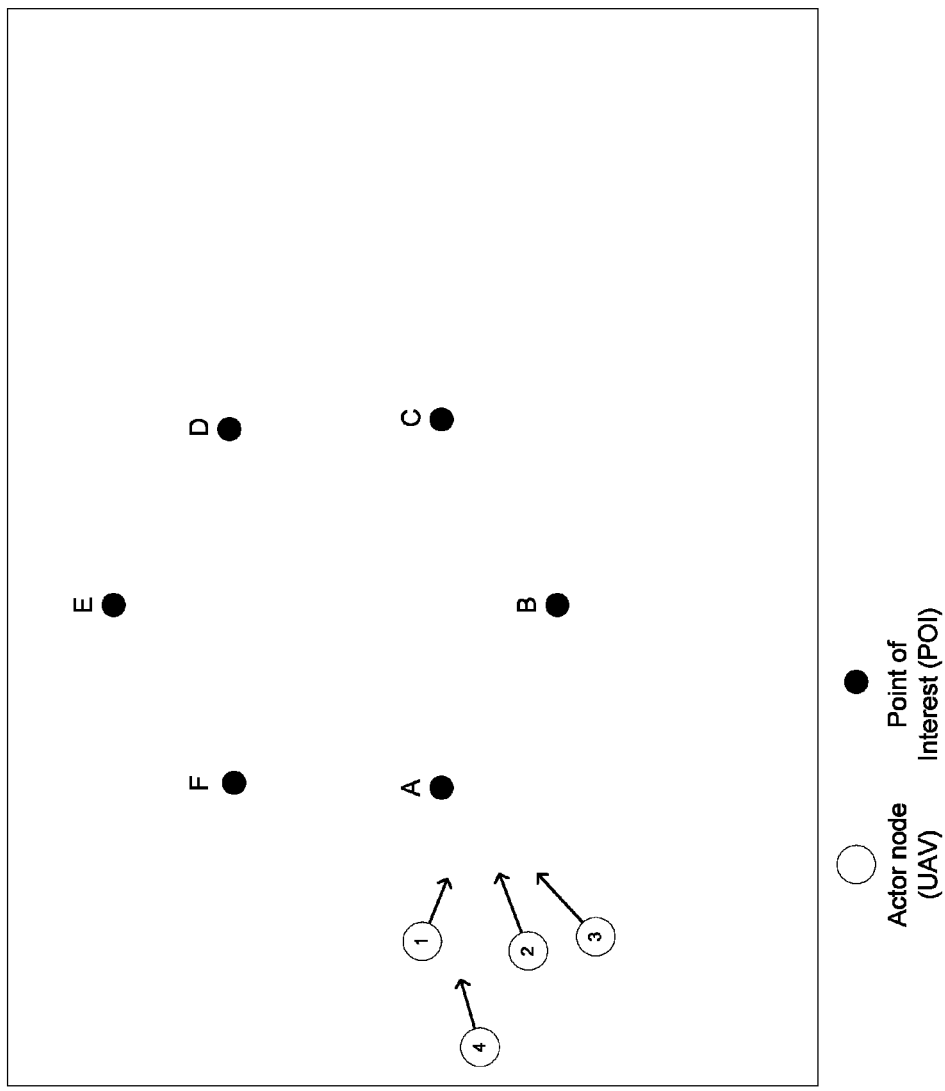
FIG. 14 is a schematic diagram illustrating a fourth scenario in which six points of interest determined by four UAVs results in each UAV changing their random direction to initially move toward a same point of interest of highest attraction.
Figure 15:
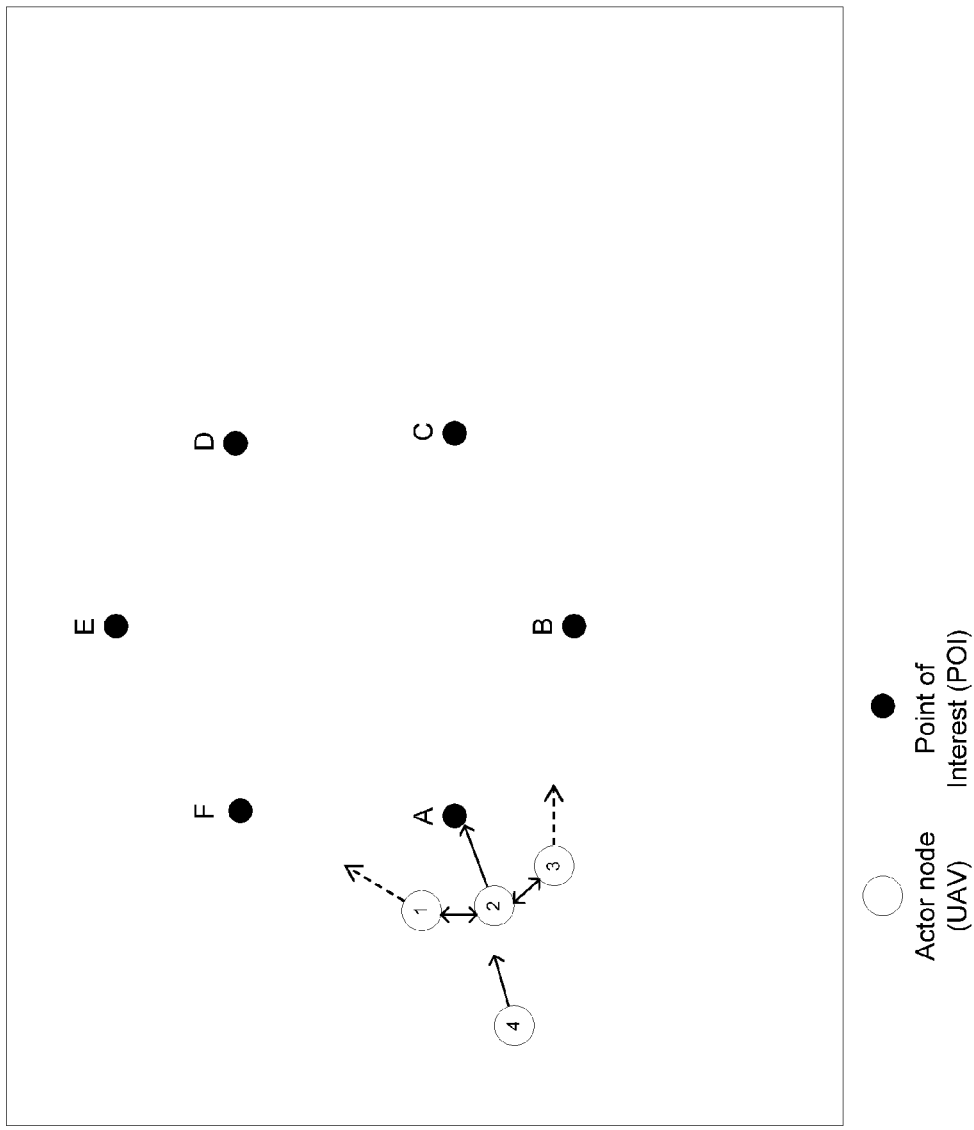
FIG. 15 is another schematic diagram of the fourth scenario as the second UAV approaches a first point of interest and, and the first and third UAVs are redirected toward different points of interest.
Figure 16:
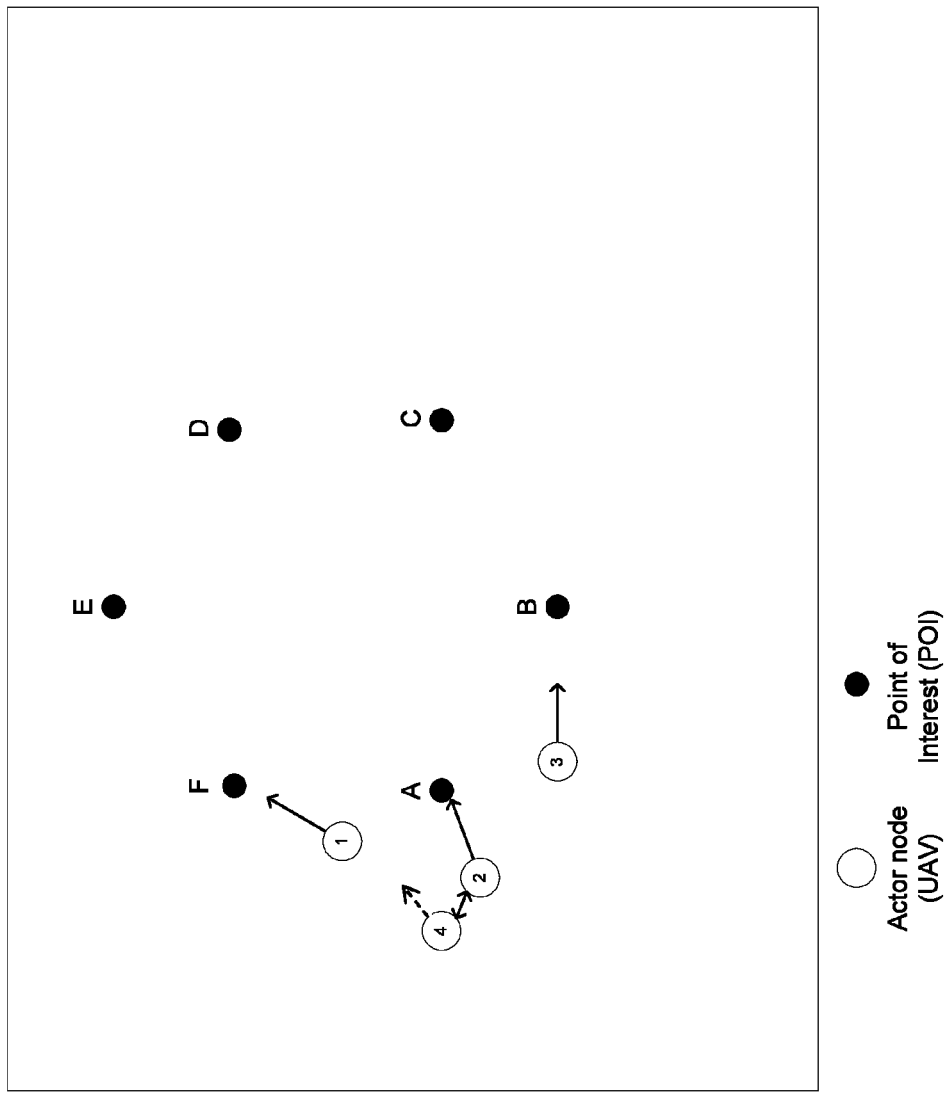
FIG. 16 is another schematic diagram of the fourth scenario as the fourth UAV approaches the second UAV and is redirected toward a different point of interest.
Figure 17:
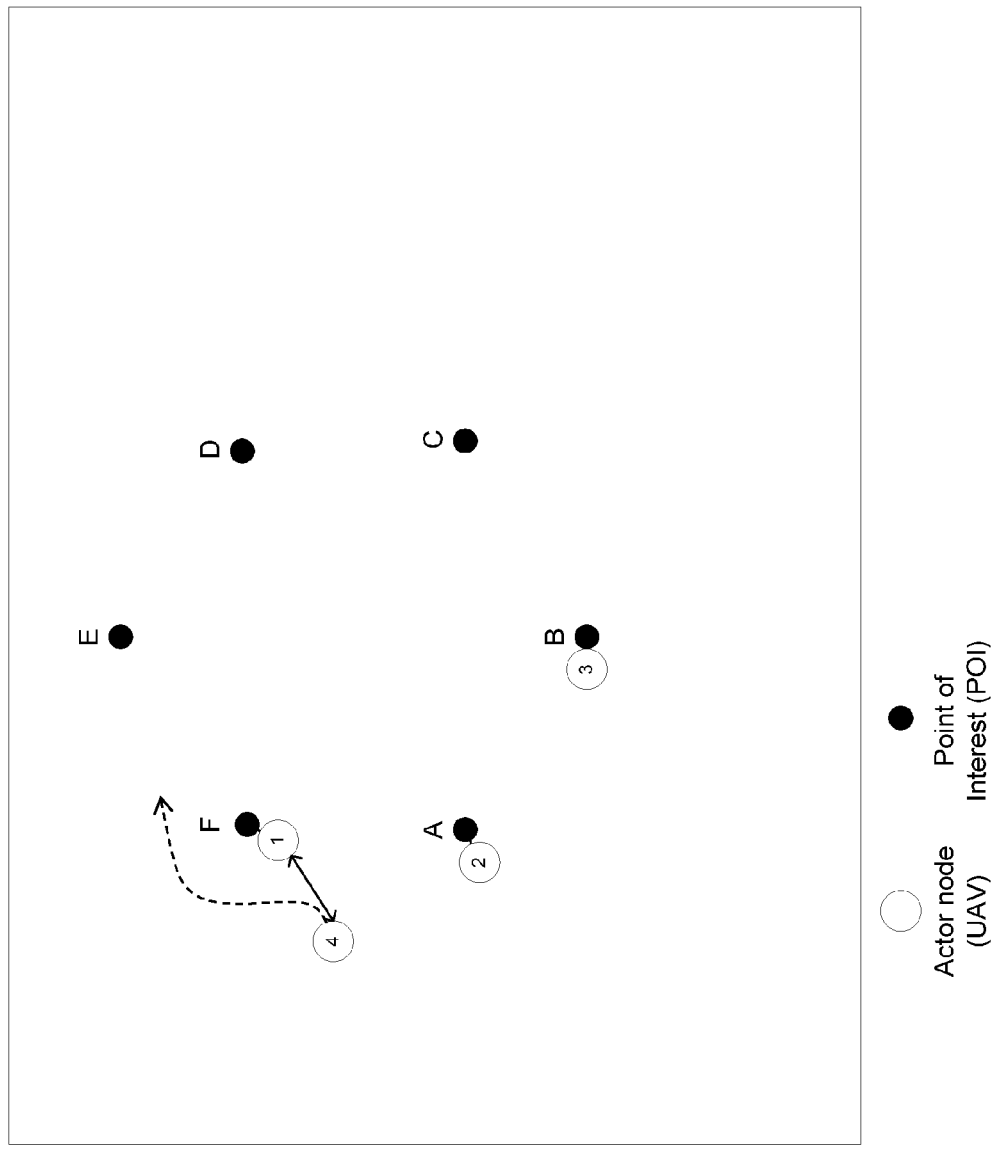
FIG. 17 is another schematic diagram of the fourth scenario as the fourth UAV approaches the first UAV and is redirected toward yet a different point of interest.

Referring now to FIGS. 14-17, there is shown a fourth scenario in which there are now more POIs (six) than there are UAVs. In addition, at the time of identifying the POIs, each UAV is in the same general area with respect to one another and has initially identified POI "A" as their POI of highest attraction. Accordingly, each of UAVs 1-4 head toward POI "A" at first, as shown in FIG. 14. In FIG. 15, it is seen that UAV 2 is the first to reach the claiming range, and as UAV 1 and UAV 3 approach, they become repelled from UAV 2. This in turn causes UAV 1 and UAV 3 to be redirected toward their newest POIs of highest attraction, POI "F" and POI "B", respectively. UAV 4, still not too close to UAV 2, continues to move toward POI "A". Then, in FIG. 16, UAV 4 comes sufficiently close to UAV 2 so that it too becomes repelled and is redirected to a new POI of highest attraction, POI "F". As then shown in FIG. 17, UAV 2 has claimed POI "A", UAV 3 has claimed POI "B" and UAV 1 has claimed POI "F". Since POI "F" is claimed by UAV 1, UAV 4 will then become repulsed from UAV 1 and acquire a new POI of highest attraction, such as POI "E" for example. As there are more POIs than UAVs, UAV 4 will then claim POI "E" once it reaches claiming range.

As a UAV nears its POI of highest attraction, its speed may be scaled down as to allow the UAV to come to a near stop when reaching its destination. For practical purposes, the ability of an aerial vehicle to do so would be based on the type of UAV, and thus the actual movement of the UAV may vary depending on the type vehicle in use (e.g., circling pattern, hovering pattern, etc.). When a UAV is near its point of interest, and feels the effects of a repulsion force from another UAV, its speed may be increased based on the strength of the repulsion force and its distance from its point of interest.

Figure 19:
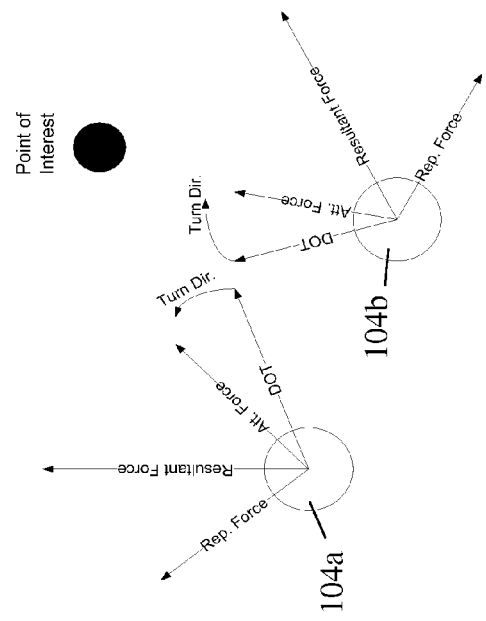
FIG. 19 schematically depicts the summation of attraction forces (to a point of interest) and repulsion forces for a pair of UAVs so as to determine a resultant force and turn direction for each.
Figure 18:
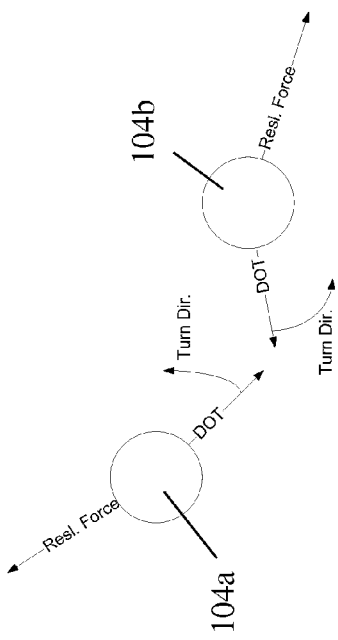
FIG. 18 schematically depicts repulsion of a pair of UAVs.

One initial challenge in generating a repulsion method is creating a generic anti-collision response for every situation when two or more UAVs are in close proximity, and in particular, to determine which direction the UAV should turn. In this regard, FIG. 18 schematically depicts repulsion of a pair of UAVs 104a, 104b, illustrating the current direction of travel (DOT) of each UAV, and the resultant force and turn direction for each. The total repulsion forces, resultant force, and resultant angle and turn angle are calculated until the UAV(s) in question create enough distance between them as compared to the predefined "too close" distance. By way of further illustration, FIG. 19 schematically depicts the summation of attraction forces (to a point of interest) and repulsion forces for a pair of UAVs 104a, 104b, so as to determine a resultant force and turn direction for each.

Figure 20:
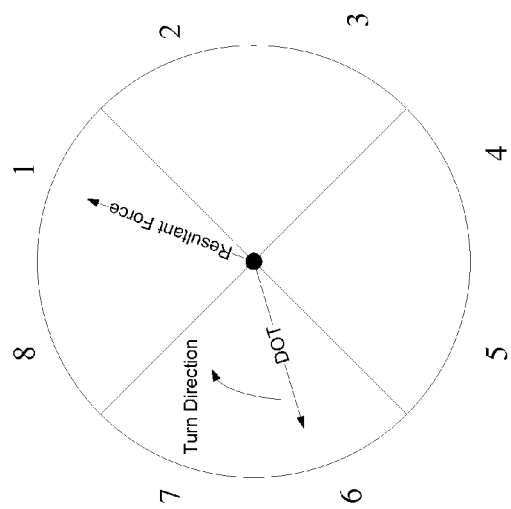
FIG. 20 is an octant diagram depicting the determination of a turn direction of a UAV based on a comparison between the octant of the direction of travel with the resultant force octant.

In order to prevent UAVs from turning in opposite directions when traveling towards one other and potentially colliding, the potential 360° of turn angle for each UAV may be divided into eight octants. In so doing, where two or more UAVs enter into close proximity of one another, the direction of travel octant may be compared to the octant that contained the resultant force on the UAV in question. This resultant force indicates the direction that the UAV desires to travel as a result of the forces being applied onto it. By comparing the direction of travel octant to the resultant force octant, a determination can be made as to which direction to turn to avoid collision with another UAV in close proximity. By way of illustration, FIG. 20 is an octant diagram depicting the determination of a turn direction based on a comparison between the octant of the direction of travel (octant 6) with the resultant force octant (octant 1). This method can also be used to determine the turn direction when both attraction and repulsion forces act on a UAV.

Still another technical issue that may be considered is to specifically determine how the attraction and repulsion forces are to be calculated, and their relationship with respect to one another. In a case where both of these forces act on a UAV approaching its point of interest, the desired outcome is for the UAV to move closer to its point of interest—but if another UAV is in the way, to do so without causing a collision. This suggests that the repulsion factor be made stronger than the attraction factor when calculating the total force on an individual UAV. However, if the repulsion factor is too much larger than the attraction factor, then the UAV could possibly never reach its point of interest due to the repulsion by other UAVs. Thus, in one exemplary embodiment, favorable results may be achieved by setting the repulsion factor to about 1.5 times the attraction factor.

Figure 21:
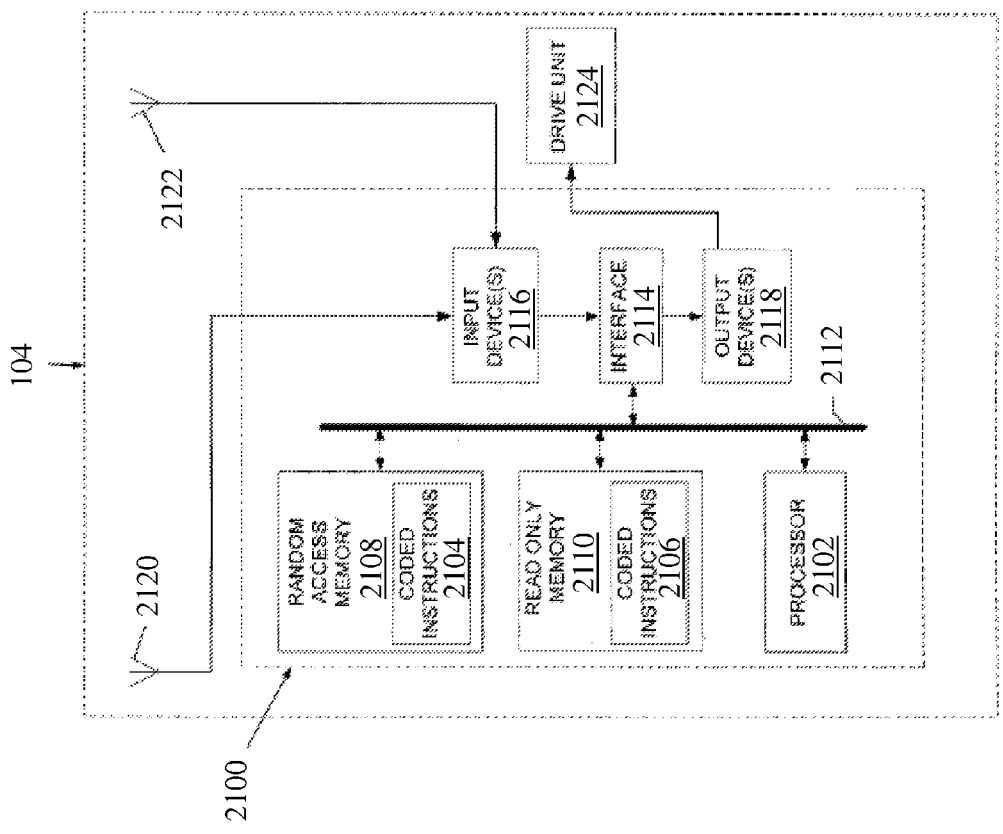
FIG. 21 is a schematic block diagram of an exemplary computer processing platform that may be used by a UAV in implementing the architecture and method embodiments of FIGS. 1-20.

Finally, FIG. 21 is a schematic block diagram of an exemplary computer processing platform 2100 that may be used by a UAV 104 in implementing the architecture and method embodiments of FIGS. 1-20. For example, the processing platform 2100 may be implemented by one or more general-purpose processors, processor cores, microcontrollers, etc. In the example depicted, the processing platform 2100 includes at least one general-purpose programmable processor 2102 that executes coded instructions 2104 and/or 2106 present in main memory of the processor 2102 (e.g., within a RAM 2108 and/or a ROM 2110). The processor 2102 may be any type of processing unit, such as a processor core, a processor and/or a microcontroller. The processor 2102 may execute, among other aspects, the example process of FIG. 2 to implement the example methods and architecture described herein.

As further illustrated in FIG. 21, the processor 2102 is in communication with the main memory (including the ROM 2110 and/or the RAM 2108) via a bus 2112. The RAM 2108 may be implemented by dynamic random-access memory (DRAM), synchronous dynamic random-access memory (SDRAM), and/or any other type of RAM device, and the ROM 2110 may be implemented by flash memory and/or any other desired type of memory device. Access to the RAM 2108 and the ROM 2110 may be controlled by a memory controller (not shown). The memory devices 2108, 2110 may be used to, for example, implement the example methods described herein.

The processing platform 2100 also includes an interface circuit 2114, which may be implemented by any type of interface standard, such as an external memory interface, serial port, general-purpose input/output, etc. One or more input devices 2116 and one or more output devices 2118 are connected to the interface circuit 2114. The example input device(s) 2116 may include, for example, a pair of spaced apart directional antennas 2120, 2122 having directional sensitivity. The example output device(s) 2148 may include, for example, a drive unit 2124.

Although an exemplary manner of implementing the UAV 104 has been illustrated in FIG. 21, will be appreciated that one or more of the data structures, elements, processes and/or devices illustrated in FIG. 21 may be combined, divided, re-arranged, omitted, eliminated and/or implemented in any way. Further, the example UAV 104 may be implemented by hardware, software, firmware and/or any combination of hardware, software and/or firmware. Further still, the example UAV 104 may include data structures, elements, processes and/or devices instead of, or in addition to, those illustrated in FIG. 21 and/or may include more than one of any or all of the illustrated data structures, elements, processes and/or devices.

As will thus be appreciated, the above described embodiments provide for autonomous coordination of agents using an attraction and repulsion method that sets attraction levels on points of interest and a repulsion factor between the agents. In essence, agents are attracted to points of interest based on their distance from the point (being most attracted to the closest point of interest, for example) and also repulsed from each other (such that the repulsion is stronger the closer the agents are to each other). The attraction forces and repulsion forces are calculated and summed to provide a turning vector to allow the agents to avoid collision, yet maintain a heading towards their points of interest.

The techniques described herein extend to coordinating UAVs in a variety of formations for reasons including, but not limited to, monitoring a given area, providing communication links, or providing supplies to an area in need, for example.

While the disclosure has been described with reference to a preferred embodiment or embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A method of controlling movement of an agent operating within an autonomous system, the method comprising:
   determining, using a processing device associated with the agent, at least one point of interest (POI) within an area of operation by the autonomous system;
   determining, from the at least one POI, a POI of highest attraction for the agent and calculating an attraction force for the agent, based on the location of the POI of highest attraction;
   determining proximity of the agent to one or more additional agents operating within the autonomous system, and calculating a repulsion force for the agent so as to maintain a minimum separating distance between the agent and the one or more additional agents;
   calculating a resultant force for the agent based on the attraction force and the repulsion force; and
   changing a direction of the agent based on the resultant force.

2. The method of claim 1, further comprising:
   determining whether the agent is within a claiming range of the POI of highest attraction, the claiming range corresponding to a distance from the POI of highest attraction that allows the agent to determine whether the POI of highest attraction has already been claimed by another agent; and upon reaching the claiming range, claiming the POI of highest attraction in the event the POI of highest attraction has not already been claimed by another agent, wherein claiming the POI of highest attraction corresponds to the agent maintaining its position at or near the POI of highest attraction.

3. The method of claim 2, further comprising:
upon reaching the claiming range and determining that the POI of highest attraction has already been claimed by another agent, determining whether there are any other points of interest (POIs); and
in the event there is at least one other POI, determining a new POI of highest attraction from the at least one other POI and changing the direction of the agent based on a location of the new POI of highest attraction.

4. The method of claim 3, further comprising:
upon reaching the claiming range and determining that the POI of highest attraction has already been claimed by another agent, and further determining that there are no other POIs, maintaining the agent in the vicinity of the POI of highest attraction claimed by another agent, until one or more of:
at least one other point of interest is determined; and
the POI of highest attraction is no longer a point of interest.

5. The method of claim 4, wherein a POI of highest attraction for the agent is determined using a weighting factor, the weighting factor including a distance between the agent and the POI.

6. The method of claim 5, wherein the weighting factor includes the determination of whether an original POI of highest attraction has already been claimed by another agent, such that in the event the original POI of highest attraction has already been claimed by another agent, another POI of undetermined claiming status becomes a new POI of highest attraction for the agent regardless of whether the original POI of highest attraction is closest to the agent.

7. The method of claim 1, wherein the resultant force is based only on the repulsion force in the absence of any determined POIs.

8. The method of claim 1, wherein the changing a direction of the agent based on the resultant force comprises determining a turn angle for the agent.

9. The method of claim 8, wherein determining a turn angle for the agent further comprises dividing a 360° range of turn for the agent into octants, comparing an octant of direction of travel for the agent to an octant of the calculated resultant force for the agent, and selecting a turn direction for the agent.

10. The method of claim 1, wherein the agent comprises an unmanned aerial vehicle (UAV).

11. A moveable agent configured to operate within an autonomous system, the agent comprising:
a processing platform having at least one general-purpose programmable processor, the processor configured to:
determine, using a processing device associated with the agent, at least one point of interest (POI) within an area of operation by the autonomous system;
determine, from the at least one POI, a POI of highest attraction for the agent and calculating an attraction force for the agent, based on the location of the POI of highest attraction;
determine proximity of the agent to one or more additional agents operating within the autonomous system, and calculating a repulsion force for the agent so as to maintain a minimum separating distance between the agent and the one or more additional agents;
calculate a resultant force for the agent based on the attraction force and the repulsion force; and
change a direction of the agent based on the resultant force.

12. The agent of claim 11, wherein the processor is further configured to:
determine whether the agent is within a claiming range of the POI of highest attraction, the claiming range corresponding to a distance from the POI of highest attraction that allows the agent to determine whether the POI of highest attraction has already been claimed by another agent; and
upon reaching the claiming range, claim the POI of highest attraction in the event the POI of highest attraction has not already been claimed by another agent, wherein claiming the POI of highest attraction corresponds to the agent maintaining its position at or near the POI of highest attraction.

13. The agent of claim 12, wherein the processor is further configured to:
upon reaching the claiming range and determining that the POI of highest attraction has already been claimed by another agent, determine whether there are any other points of interest (POIs); and
in the event there is at least one other POI, determine a new POI of highest attraction from the at least one other POI and change the direction of the agent based on a location of the new POI of highest attraction.

14. The agent of claim 13, wherein the processor is further configured to:
upon reaching the claiming range and determining that the POI of highest attraction has already been claimed by another agent, and further determining that there are no other POIs, maintain the agent in the vicinity of the POI of highest attraction claimed by another agent, until one or more of:
at least one other point of interest is determined; and
the POI of highest attraction is no longer a point of interest.

15. The agent of claim 14, wherein a POI of highest attraction for the agent is determined using a weighting factor, the weighting factor including a distance between the agent and the POI.

16. The agent of claim 15, wherein the weighting factor includes the determination of whether an original POI of highest attraction has already been claimed by another agent, such that in the event the original POI of highest attraction has already been claimed by another agent, another POI of undetermined claiming status becomes a new POI of highest attraction for the agent regardless of whether the original POI of highest attraction is closest to the agent.

17. The agent of claim 11, wherein the resultant force is based only on the repulsion force in the absence of any determined POIs.

18. The agent of claim 11, wherein the changing a direction of the agent based on the resultant force comprises determining a turn angle for the agent.

19. The agent of claim 18, wherein determining a turn angle for the agent further comprises dividing a 360° range of turn for the agent into octants, comparing an octant of direction of travel for the agent to an octant of the calculated resultant force for the agent, and selecting a turn direction for the agent.

20. The agent of claim 11, wherein the agent comprises an unmanned aerial vehicle (UAV).

* * * * *